(12) United States Patent
Van Zeijl et al.

(10) Patent No.: US 9,119,243 B2
(45) Date of Patent: Aug. 25, 2015

(54) LIGHTING SYSTEM WITH RADAR DETECTION

(75) Inventors: Paulus Thomas Maria Van Zeijl, Eindhoven (NL); Henricus Theodorus Van Der Zanden, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 292 days.

(21) Appl. No.: 13/882,852

(22) PCT Filed: Oct. 25, 2011

(86) PCT No.: PCT/IB2011/054754
§ 371 (c)(1),
(2), (4) Date: May 1, 2013

(87) PCT Pub. No.: WO2012/059842
PCT Pub. Date: May 10, 2012

(65) Prior Publication Data
US 2013/0229116 A1    Sep. 5, 2013

(30) Foreign Application Priority Data
Nov. 2, 2010    (EP) .................................... 10189697

(51) Int. Cl.
*H05B 37/02* (2006.01)
*G01S 13/04* (2006.01)
*G01S 13/50* (2006.01)
*G01S 13/87* (2006.01)
*G01S 13/88* (2006.01)

(52) U.S. Cl.
CPC ............ *H05B 37/0227* (2013.01); *G01S 13/04* (2013.01); *G01S 13/50* (2013.01); *G01S 13/87* (2013.01); *G01S 13/88* (2013.01); *H05B 37/0263* (2013.01); *Y02B 20/72* (2013.01)

(58) Field of Classification Search
CPC   H05B 37/0227; H05B 37/0263; G01S 13/04; G01S 13/50; G01S 13/87; G01S 13/88
See application file for complete search history.

(56) References Cited

U.S. PATENT DOCUMENTS

| 3,587,097 | A | 6/1971 | Stull, Jr. |
| 4,400,700 | A | 8/1983 | Rittenbach |
| 5,912,822 | A | 6/1999 | Davis |
| 8,058,819 | B2 * | 11/2011 | Murakami et al. ............ 315/297 |
| 8,427,076 | B2 * | 4/2013 | Bourquin et al. ............ 315/307 |
| 8,981,671 | B2 * | 3/2015 | Karasawa et al. ............ 315/297 |
| 2009/0027255 | A1 | 1/2009 | Stove |

FOREIGN PATENT DOCUMENTS

| DE | 2118337 A1 | 11/1971 |
| DE | 202010000502 U1 | 6/2010 |
| EP | 0132232 B1 | 9/1990 |
| EP | 0813353 A2 | 12/1997 |
| EP | 1239299 B1 | 4/2005 |
| EP | 2160078 A1 | 3/2010 |
| GB | 2444734 A | 6/2008 |
| JP | 2010176911 A | 8/2010 |

* cited by examiner

*Primary Examiner* — Patrick O'Neill
(74) *Attorney, Agent, or Firm* — Meenakshy Chakravorty

(57) ABSTRACT

In a lighting system (SLS), a radar arrangement (RU1) transmits a signal (CW). The radar arrangement (RU) detects a spectral power distribution of a received signal (RF) susceptible of comprising a reflection of the signal that has been transmitted. Lighting is controlled as a function of the spectral power distribution that has been detected.

12 Claims, 3 Drawing Sheets

LIGHTING SYSTEM WITH RADAR DETECTION

FIELD OF THE INVENTION

An aspect of the invention relates to a lighting system that comprises a radar arrangement. The lighting system may be used, for example, to provide street lighting in a power-efficient manner. Other aspects of the invention relate to a method of controlling a lighting system, and a computer program product that enables a processor to carry out such a method.

BACKGROUND OF THE INVENTION

A lighting system can be provided with a radar arrangement that is capable of detecting a moving object. Lighting is provided when a moving object has been detected. For example, UK patent application published under number GB 2 444 734 describes a street lighting system that provides illumination for objects passing along a roadway. The presence of objects is detected by one or more sensors, which may be in the form of motion detection radars.

A radar unit can detect a moving object in the following manner. The radar unit radiates a transmission signal at a given frequency. An object that is sufficiently close to the radar unit causes a reflection of the transmission signal, which the radar unit can receive. The reflection is multiplied by an oscillator signal having a frequency corresponding with that of the transmission signal. Accordingly, an intermediate frequency signal is obtained. In case the object that causes the reflection is moving with respect to the radar unit, the intermediate frequency signal will comprise an alternating current component. A peak detector, which is preceded by a capacitor, detects the alternating current component. The capacitor rejects a direct current component that would occur if the object were stationary. Accordingly, the peak detector provides an indication whether a moving object is within a given range, or not.

SUMMARY OF THE INVENTION

There is a need for a solution that allows more versatile control of lighting based on radar detection.

In accordance with an aspect of the invention, a lighting system comprises:

a radar arrangement arranged to transmit a signal and to detect a spectral power distribution of a received signal susceptible of comprising a reflection of the signal that has been transmitted; and a control arrangement arranged to control lighting as a function of the spectral power distribution that has been detected.

The spectral power distribution of the received signal provides useful information in addition to a mere indication whether a moving object is present, or not. Namely, the spectral power distribution may provide speed information and may further provide distance information. Moreover, the spectral power distribution may provide such information regarding a plurality of objects that are within a detection range of the radar arrangement. A lighting control that takes into account a speed with which an object moves is more versatile than a lighting control that merely detects movement of an object. This greater versatility allows a more power efficient lighting, and further allows a lighting that contributes to comfort and safety.

An implementation of the invention advantageously comprises one or more of the following additional features, which are described in separate paragraphs. These additional features each contribute to achieving versatile control of lighting.

The control arrangement is advantageously arranged to control at least one of the following properties of the lighting as a function of the spectral power distribution that has been detected: an area that the lighting covers, an intensity of the lighting, and a temporal variation of the lighting.

The radar arrangement is advantageously arranged to carry out respective level detections in respective frequency ranges that correspond with respective frequency differences between the signal that is transmitted and the received signal. The control arrangement is then advantageously arranged to control the lighting depending on the respective level detections in the respective frequency ranges.

The lighting system may comprise at least one lamp disposed for illuminating a slow traffic lane, and a least one lamp disposed for illuminating a fast traffic lane. The control arrangement is then advantageously arranged to activate at least one lamp disposed for illuminating the slow traffic lane if a level detection in a frequency range that correspond with a low frequency difference indicates that the spectral power distribution exceeds a threshold in that frequency range, and to activate at least one lamp disposed for illuminating the fast traffic lane in case a level detection in a frequency range that correspond with a high frequency difference indicates that the spectral power distribution exceeds a threshold in that frequency range.

The lighting system may comprise respective lamps disposed for illuminating respective portions of a lane. The control arrangement is then advantageously arranged to activate a number of consecutive lamps, whereby the higher a frequency range is in which a level detection indicates that the spectral power distribution exceeds a threshold in this frequency range, the larger the number of consecutive lamps that are activated.

The control arrangement is advantageously arranged to control a temporal variation of the lighting depending on the respective level detections in the respective frequency ranges.

The radar arrangement is advantageously arranged to apply respective thresholds to respective level detections in respective frequency ranges.

The radar arrangement advantageously comprises a beam forming arrangement so as to concentrate power of the signal in a particular direction. The respective thresholds are then advantageously adjusted in dependence on the particular direction in which the power of the signal is concentrated.

The radar arrangement advantageously comprises a Fourier transform module arranged to provide a frequency domain representation of the received signal, and a detection module arranged to detect the spectral power distribution of the received signal from the frequency domain representation.

The lighting system may comprise a set of lighting modules. The radar arrangement may then advantageously comprise respective radar modules associated with respective lighting modules, whereby a radar module is arranged to individually transmit a signal and to individually detect a spectral power distribution of a received signal susceptible of comprising a reflection of the signal that has been transmitted. The control arrangement may advantageously comprise respective control modules associated with respective lighting modules. A control module is arranged to control the lighting module with which the control module is associated and at least one other lighting module.

The radar arrangement is advantageously arranged so that the signal, which is transmitted, is at least temporarily a frequency-modulated carrier.

The radar arrangement is advantageously arranged to apply respective thresholds to respective level detections in respective frequency ranges, whereby the thresholds increase as the respective frequency ranges correspond with greater frequency differences between the signal that is transmitted and the received signal.

The control arrangement advantageously comprises a control override module through which a user can control the lighting independent of the spectral power distribution of the received signal that has been detected.

For the purpose of illustration of the invention, as well as the additional features, a detailed description of particular embodiments is provided with reference to drawings.

DETAILED DESCRIPTION OF THE EMBODIMENTS

Figure 1:
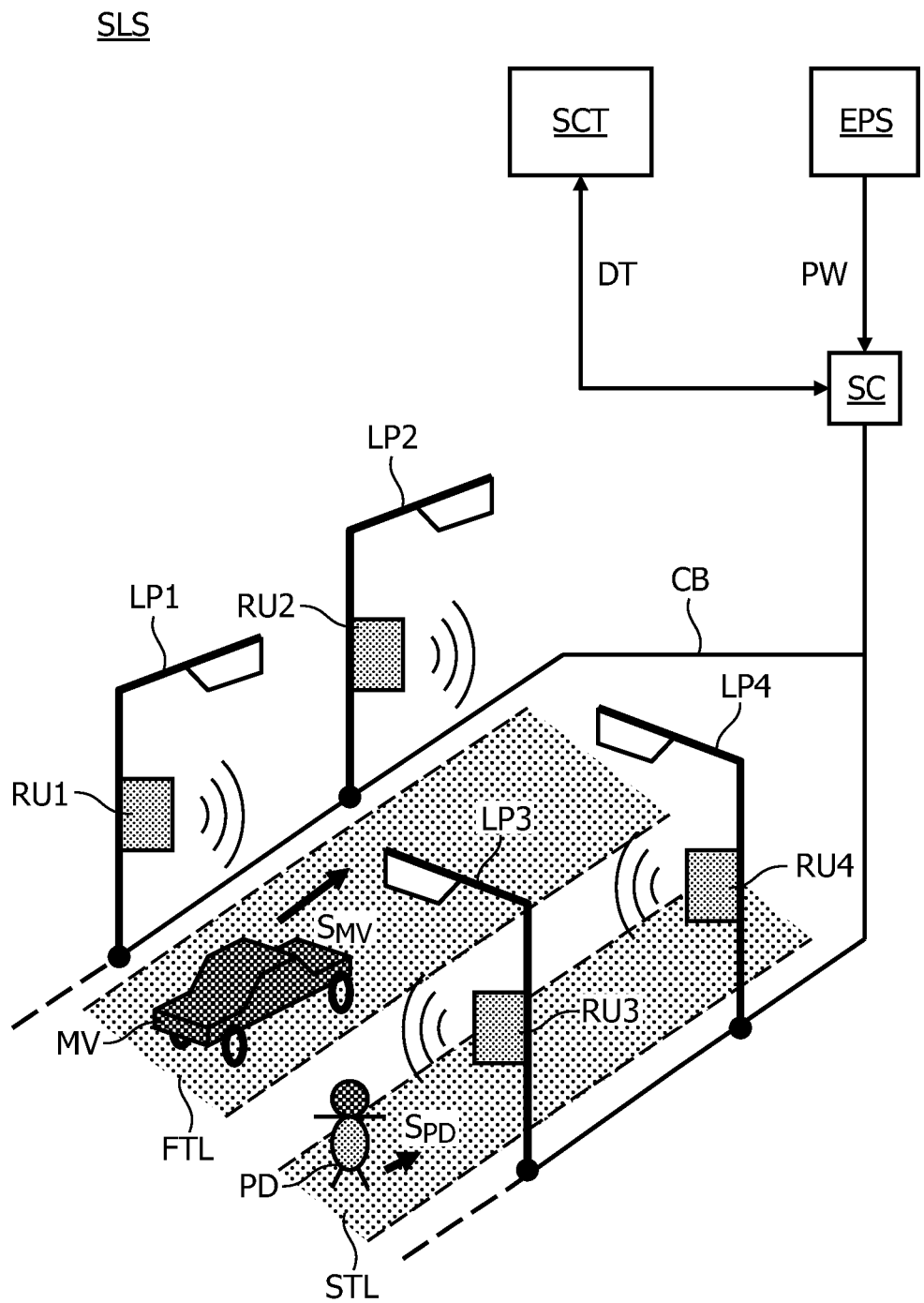
FIG. 1 is a pictorial diagram that illustrates a street lighting system comprising a plurality of radar units.

FIG. 1 pictorially illustrates a street lighting system SLS. The street lighting system SLS comprises respective lampposts LP1-LP4, which are provided with respective radar units RU1-RU4. A lamppost typically comprises one or more lamps that are housed in a luminary unit. A radar unit is preferably integrated in the luminary unit of the lamppost, where the radar unit is relatively safe from aggressions, in particular vandalism. The street lighting system SLS further comprises a system controller SCT and an electrical power source EPS, which are jointly coupled to a splitter-combiner SC. A power distribution cable CB couples the respective lampposts LP1-LP4 with their respective radar units RU1-RU4 to the splitter-combiner SC.

The street lighting system SLS is disposed along a road that comprises two lanes: a fast traffic lane FTL and a slow traffic lane STL. The fast traffic lane FTL is primarily intended for motor vehicles. FIG. 1 depicts a motor vehicle MV that drives with a given speed $S_{MV}$ on the fast traffic lane FTL. The slow traffic lane STL is primarily intended for pedestrians and non-motorized vehicles, such as, for example, bicycles. FIG. 1 depicts a pedestrian PD who walks with a given speed $S_{PD}$ on the slow traffic lane STL. Lampposts LP1, LP2 are primarily disposed for illuminating the fast traffic lane FTL. Lampposts LP3, LP4 are primarily disposed for illuminating the slow traffic lane STL.

The street lighting system SLS basically operates as follows. A radar unit, which is associated with a lamppost, controls the lamppost depending on detection of a moving object. For example, radar unit RU1 may switch on lamppost LP1 in case this radar unit detects the motor vehicle MV, which drives with the speed $S_{MV}$. Radar unit RU1 may further switch on lamppost LP2 by transmitting a command to this lamppost, either directly or indirectly via the system controller SCT. Radar unit RU3 may switch on lamppost LP3 in case this radar unit detects the pedestrian PD, who walks with the speed $S_{PD}$.

The system controller SCT can transmit data DT and receive data DT, which will be referred to as downlink data and uplink data, respectively, hereinafter. The splitter-combiner SC superposes, as it were, the downlink data from the system controller SCT on an electrical power signal PW, which the electrical power source EPS provides. Accordingly, the downlink data can reach the respective radar units RU1-RU4 via the power distribution cable CB. Conversely, a radar unit transmits uplink data by superposing this data on the electrical power signal PW. The uplink data reaches the splitter-combiner SC via the power distribution cable CB. The splitter-combiner SC extracts the uplink data so that the system controller SCT receives this data.

Figure 2:
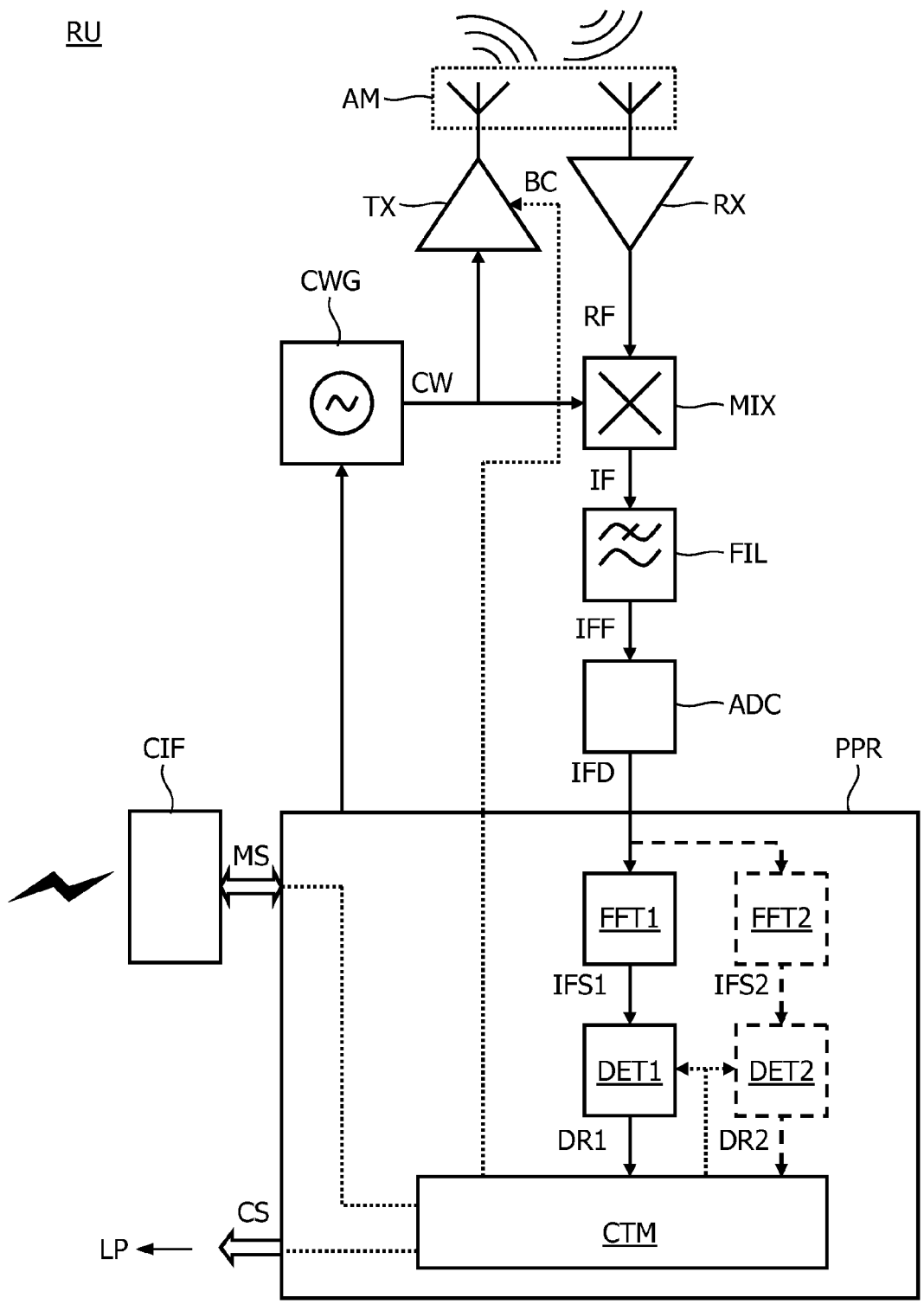
FIG. 2 is a block diagram that illustrates a radar unit.

FIG. 2 schematically illustrates a radar unit RU, which can be regarded as representative of the respective radar units RU1-RU4 illustrated in FIG. 1. The radar unit RU can therefore be associated with any of the lampposts LP1-LP4. The radar unit RU comprises the following basic modules: a carrier wave generator CWG, a transmission amplifier TX, an antenna module AM, a reception amplifier RX, a mixer MIX, a reception filter FIL, an analog to digital converter ADC, a programmable processor PPR, and a communication interface CIF. The communication interface CIF may be coupled to the power distribution cable CB illustrated in FIG. 1 via a splitter-combiner, which can separate data from the power supply signal and superpose data on the power supply signal.

In more detail, the carrier wave generator CWG may comprise, for example, a phase lock loop that receives a reference frequency. The reference frequency may be generated in the radar unit RU itself, or may be applied to the radar unit RU via, for example, the power distribution cable CB. The antenna module AM may comprise a single antenna, or a single group of antennas, which is used for transmission and reception. Alternatively, the antenna module AM may comprise a pair of antennas, or a pair of groups of antennas, one that is used for transmission, the other being used for reception.

The transmission amplifier TX may comprise a beam forming arrangement, which may be complemented with a beam steering arrangement. In that case, the transmission amplifier TX will typically comprise a bank of phase shifters, or a bank of delay lines, or both. The transmission amplifier TX may further comprise a bank of amplifiers coupled to the bank of phase shifters, or the bank of delay lines, whichever of those two is present in the beam forming arrangement. It should be noted that the reception amplifier RX may also comprise a beam forming ad steering arrangement.

The programmable processor PPR comprises a Fourier transform module FFT1, a detection module DET1, and a control module CTM. Optionally, the programmable processor PPR may further comprise an additional Fourier transform module FFT2 and additional detection module DET2, which are illustrated by means of broken lines. The aforementioned modules may each be in the form of, for example, a set of instructions that has been loaded into a program memory of the programmable processor PPR. In such a software-based implementation, the set of instructions defines operations that the module concerned carries out, which will be described hereinafter.

The control module CTM is communicatively coupled to the lamppost with which the radar unit RU is associated. To that end, the radar unit may comprise a control interface, which is not represented in FIG. 2 for reasons of simplicity.

The control module CTM is further communicatively coupled to other lampposts via the communication interface CIF.

The radar unit RU basically operates as follows. The carrier wave generator CWG provides a carrier signal CW. The carrier signal CW may have a stationary frequency or a frequency that is modulated. In case the carrier signal CW has a frequency modulation, the frequency modulation may be, for example, triangular or saw tooth shaped. The programmable processor PPR may control the frequency of the carrier signal CW and the frequency modulation, if any. This frequency control is preferably so that the frequency of the carrier signal CW is different from that of other carrier signals in neighboring radar units. This prevents interference, which can cause erroneous detection. The programmable processor PPR may further control the carrier wave generator CWG so that the carrier signal CW alternately has a stationary frequency and a modulated frequency.

The transmission amplifier TX amplifies the carrier signal CW, which is transmitted by means of the antenna module AM. Accordingly, the basic radar unit RU radiates a transmission signal, which is an amplified version of the carrier signal CW. In case the transmission amplifier TX comprises a beam forming arrangement, the transmission signal can be transmitted in a particular direction. In case this beam forming arrangement is complemented with a beam steering arrangement, this particular direction can be adjusted in dependence on a beam control signal BC that the programmable processor PPR may provide as illustrated in FIG. 2.

In case an object is sufficiently close to the radar unit RU, the antenna module AM receives a sufficiently strong reflection of the transmission signal. The reception amplifier RX provides a reception signal RF, which comprises this reflection, or rather an amplified version thereof. The mixer MIX effectively multiplies the reception signal RF by the carrier signal CW. Accordingly, the mixer MIX provides an intermediate frequency signal IF, which is a frequency shifted version of the reception signal RF.

The reception filter FIL, which has a given frequency passband, filters the intermediate frequency signal IF. The reception filter FIL provides a filtered intermediate frequency signal IFF, which comprises spectral components of the intermediate frequency signal IF that fall within the given frequency passband. Spectral components outside the frequency passband are attenuated to a relatively large extent. The reception filter FIL preferably contributes to preventing aliasing, which is inherent to a sampling operation in the analog to digital converter ADC. Moreover, the reception filter FIL may provide a so-called pre-emphasis based on dynamic range properties of the analog to digital converter ADC. The analog to digital converter ADC provides a digital representation IFD of the filtered intermediate frequency signal IFF. This digital representation will be referred to as digital intermediate frequency signal IFD hereinafter. The digital intermediate frequency signal IFD is a stream of samples.

The Fourier transform module FFT1 provides a frequency domain representation IFS1 of the digital intermediate frequency signal IFD. This frequency domain representation will be referred to as intermediate frequency spectrum representation IFS1 hereinafter. More specifically, the Fourier transform module FFT1 converts respective consecutive series of samples in the digital intermediate frequency signal IFD into respective consecutive momentary intermediate frequency spectrum representations. That is, a series of samples, which covers a particular time interval, translates into a momentary frequency spectrum representation, which applies to this particular time interval. A subsequent series of samples, which covers a subsequent time interval, translates into a subsequent momentary frequency spectrum, which applies to this subsequent time interval, and so on. The additional Fourier transform module FFT2 operates in a similar fashion. The additional Fourier transfer module provides an additional intermediate frequency spectrum representation IFS2.

Figure 3:
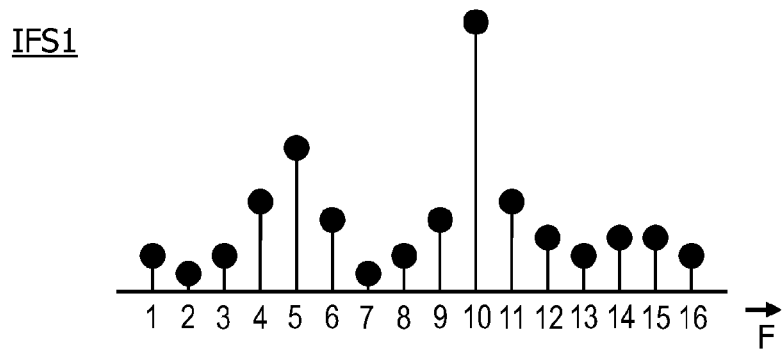
FIG. 3 is a signal diagram that illustrates a frequency domain representation of an intermediate frequency signal in the radar unit.

FIG. 3 illustrates an example of the intermediate frequency spectrum representation IFS1. More precisely, FIG. 3 illustrates an example of a momentary intermediate frequency spectrum representation. FIG. 3 is a graph with a horizontal axis, which represent frequency F, and a vertical axis, which represents magnitude. In this example, the intermediate frequency spectrum representation IFS1 comprises 16 samples, which are represented as relatively fat black dots and numbered 1, 2, . . . 16, below the horizontal axis. A sample represents a particular portion of the intermediate frequency spectrum representation IFS1. That is, a sample represents a particular frequency interval in the intermediate frequency spectrum representation IFS1. A sample has a particular magnitude, which is illustrated by means of a relatively thin line that is in parallel with the vertical axis and that extends between the dot representing the sample and the horizontal axis. The magnitude of a sample corresponds with spectral power in the frequency interval that the sample represents.

It should be noted that the intermediate frequency spectrum representation IFS1 typically extends from zero (direct current) up to a maximum frequency. The maximum frequency typically depends on a sample frequency, that is, a frequency with which samples occur that undergo a Fourier-type transform so as to obtain the intermediate frequency spectrum representation IFS1. In any case, given that the sampling operation in the analog to digital converter ADC is carried out with a given sampling frequency, the maximum frequency of the intermediate frequency spectrum representation IFS1 will typically not exceed half this sampling frequency. In addition, there is no need for the maximum frequency of the intermediate frequency spectrum representation IFS1 extending beyond the passband of the reception filter FIL.

The intermediate frequency spectrum representation IFS1 provides information on presence of objects and, in addition, speed information relating to these objects. This applies in case the carrier signal CW has a stationary frequency; there is no frequency modulation. In case the carrier signal CW is frequency modulated, the intermediate frequency spectrum representation IFS1 further provides distance information relating to objects that are detected. Speed information may then also be derived from the intermediate frequency spectrum representation IFS1.

In more detail, let it be assumed that the carrier signal CW has a stationary frequency. In case there is a reflection, which is due to a moving object, the reflection will have a frequency that is shifted with respect to that of the carrier signal CW. That is, there will be a frequency difference between the carrier signal CW and the reception signal RF, which comprises the reflection. This is known as the Doppler Effect. As a result, the intermediate frequency spectrum representation IFS1 will comprise a component of relatively large magnitude at a frequency equal to the aforementioned frequency difference. The greater the speed of the object is with respect to the radar unit RU, the higher the frequency at which this component will occur in the intermediate frequency spectrum representation IFS1. Speed thus effectively translates into frequency. In case the object is stationary, which means "zero" speed, a component will occur in the intermediate frequency spectrum representation IFS1 at "zero" frequency. This is because the intermediate frequency signal IF will comprise a significant direct current component.

For example, a table presented in this paragraph illustrates a relation between the speed of an object with respect to the radar unit RU and the frequency at which a component of relatively large magnitude will occur in the intermediate frequency spectrum representation IFS1. This relation is presented for two different frequencies of the carrier signal CW.

| Speed of Object (km/hr) | Frequency of component when carrier signal CW frequency is 10 GHz | Frequency of component when carrier signal CW frequency is 60 GHz |
| --- | --- | --- |
| 1 | 18.7 Hz | 112 Hz |
| 5 | 93.3 Hz | 560 Hz |
| 20 | 373 Hz | 2.24 kHz |
| 100 | 1.87 kHz | 11.2 kHz |

Let it now be assumed that the carrier signal CW has a frequency modulation. Let it further be assumed that an object at a given distance from the radar unit RU causes a reflection, which the radar unit RU receives. The reflection will have a frequency that is shifted with respect to that of the carrier signal CW, even if the object is stationary. There will thus be a frequency difference between the carrier signal CW and the reception signal RF, which comprises the reflection. The frequency difference is a function of the distance of the object. This is due to the frequency modulation of the carrier signal CW. The intermediate frequency spectrum representation IFS1 will comprise a component of relatively large magnitude at a frequency equal to the aforementioned frequency difference. In this case, the greater the distance is of the object from the radar unit RU, the higher the frequency at which this component will occur in the intermediate frequency spectrum representation IFS1. Distance thus effectively translates into frequency.

The detection module DET1 carries out respective level detections in respective frequency ranges that are comprised in the intermediate frequency spectrum representation IFS1. A level detection in a frequency range is positive if the intermediate frequency spectrum representation IFS1 exceeds a threshold in that frequency range. Otherwise, the level detection is negative. The detection module DET1 provides a set of detection results DR1 for the respective level detections in the respective frequency ranges. A detection result of a level detection indicates whether this level detection was positive or negative in the frequency range concerned. The set of detection results DR1 provide information on spectral power distribution of the reception signal RF in a binary form. The additional detection module DET2, if present, may provide an additional set of detection results DR2 on the basis of the additional intermediate frequency spectrum representation IFS2 in a similar fashion. The Fourier transform module FFT1 and the detection module DET1 may be regarded as jointly constituting a spectral power distribution detector of a binary nature. The same applies to the additional Fourier transform module FFT2 and the additional detection module DET2.

Figure 4:
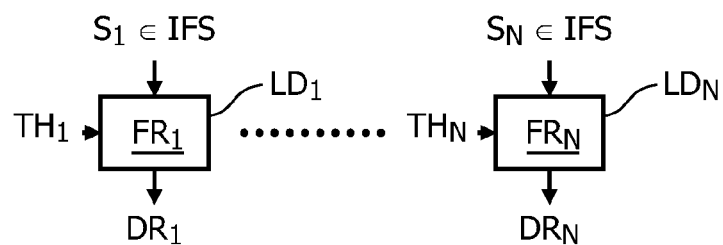
FIG. 4 is a block diagram that illustrates a detection module capable of detecting a spectral power distribution of the intermediate frequency signal.

FIG. 4 illustrates an example of implementation of the detection module DET1. The example of implementation will be referred to as detection module DET1 for reasons of convenience. The detection module DET1 comprises respective level detectors $LD_1, \ldots, LD_N$ that receive respective sets of samples $S_1, \ldots, S_N$ from the intermediate frequency spectrum representation IFS1. A set of samples covers a particular frequency range in the intermediate frequency spectrum representation IFS1. Accordingly, a level detector that receives a particular set of samples carries out a level detection in the frequency range in the set of samples covers. The respective level detectors $LD_1, \ldots, LD_N$ apply respective thresholds $TH_1, \ldots, TH_N$ for carrying out respective level detections in respective frequency ranges $FR_1, \ldots, FR_N$.

The respective thresholds $TH_1, \ldots, TH_N$ may be adjusted as a function of, for example, a particular direction into which the radar unit RU transmits the amplified version of the carrier signal CW. This applies when the transmission amplifier TX comprises a beam forming and steering arrangement. In addition to the beam control signal BC illustrated in FIG. 2, the control module CTM may then further apply a threshold control signal to the detection module DET1 so as to adjust the respective thresholds $TH_1, \ldots, TH_N$ depending on the particular transmission direction. Accordingly, the radar unit RU can be relatively sensitive in one direction, and less sensitive in another direction, in any given frequency range. This can contribute to achieving a relatively low erroneous detection ratio.

Figure 5:
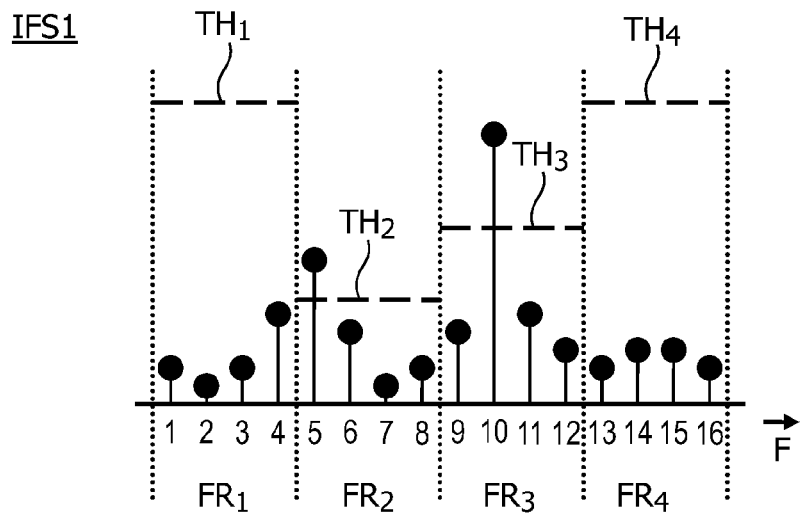
FIG. 5 is a signal diagram that illustrates an example of detecting a spectral power distribution of the intermediate frequency signal.

FIG. 5 illustrates an example of detecting a spectral power distribution of the intermediate frequency signal IF. FIG. 5 comprises the graph of FIG. 3, which illustrates the intermediate frequency spectrum representation IFS1. In the example illustrated in FIG. 5, the detection module DET1 of FIG. 4 comprises four level detectors, which implies that N=4. A first level detector receives a first set of samples that comprises samples 1 to 4, which covers a first frequency range. The first level detector applies a first threshold $TH_1$ for carrying out a level detection in the first frequency range. A second level detector receives a second set of samples that comprises samples 5 to 8, which covers a second frequency range. The second level detector applies a second threshold $TH_2$ for carrying out a level detection in the second frequency range. A third level detector receives a third set of samples that comprises samples 9 to 12, which covers a third frequency range. The third level detector applies a third threshold $TH_3$ for carrying out a level detection in this third frequency range. A fourth level detector may receive a fourth set of samples that comprises samples 13 to 16. The fourth level detector applies a fourth threshold $TH_4$ for carrying out a level detection in the fourth frequency range.

The description hereinbefore regarding the intermediate frequency spectrum representation IFS1 illustrated in FIG. 3 and the detection module DET1 illustrated in FIG. 4, equally applies to the additional frequency spectrum representation IFS2 and the additional detection module DET2, respectively. The example of detecting a spectral power distribution described hereinbefore with reference to FIG. 5 may thus also apply to the additional frequency spectrum representation IFS2.

The Fourier transform module FFT1 and the detection module DET1 illustrated in FIG. 2 may primarily be used for detecting the spectral power distribution of the reception signal RF when the carrier signal CW has a stationary frequency. The additional Fourier transform module FFT2 and the additional detection module DET2 may primarily be used for detecting the spectral power distribution of the reception signal RF when the carrier signal CW is frequency modulated. This implies that the Fourier transform module FFT1 and the detection module DET1 are dedicated to providing speed information, whereas the additional Fourier transform module FFT2 and the additional detection module DET2 are dedicated to providing distance information. The detection module DET1 can be active only when the carrier signal CW has a stationary frequency so that the set of detection results DR1 relate to speed. The additional detection module DET2 can be active only when the carrier signal CW is frequency modulated so that the additional set of detection results DR2 relate to distance. Such an implementation is thus is characterized by two detection branches: a detection branch for speed information and a detection branch for distance information.

An implementation with two detection branches can be advantageous for the following reasons. A Fourier transform module that is optimal for providing speed information need not necessarily be identical to, or even similar to, a Fourier transform module that is optimal for providing distance information. For example, a Fourier transform module can be optimized for a particular application by arranging the module so that a particular frequency characteristic is obtained, which need not necessarily be linear. Frequency warping can be used to achieve relatively high resolution in particular ranges. In an implementation with two detection branches, as illustrated in FIG. 2, the Fourier transform module FFT1 can be optimized for providing speed information, whereas the additional Fourier transform module FFT2 can be optimized for providing distance information.

Let it be assumed that the carrier signal CW has a stationary frequency of 10 GHz; there is no frequency modulation. In that case, the detection module DET1 may carry out a level detection in a frequency range comprised between 20 Hz and 100 Hz, which corresponds with a speed range that is typical for normally walking pedestrians. The detection module DET1 may carry out a further level detection in a frequency range comprised between 100 Hz and 500 Hz, which corresponds with a speed range that is typical for normally cycling cyclists. The detection module DET1 may carry out a yet further level detection in a speed range comprised between 500 Hz and 1 kHz, which corresponds with a speed range that is typical for relatively slowly driving motorized vehicles. The detection module DET1 may carry out a yet further level detection in a speech range comprised between 1 kHz and 2 kHz, which corresponds with a speed range that is typical for relatively fast driving motorized vehicles.

The detection module DET1 may apply respective thresholds $TH_1, \ldots, TH_N$ to the respective level detections in the respective frequency ranges, as explained hereinbefore with reference to FIGS. 4 and 5. Accordingly, the radar unit RU can be made relatively sensitive, or relatively insensitive, to detecting an object depending on a speed with which this object moves with respect to the radar unit RU. Stated otherwise, the radar unit RU can put more significance on an object that moves with a particular speed with respect to another object that moves with another particular speed by applying different thresholds for these respective speeds.

Referring to the example presented hereinbefore, radar unit RU1 illustrated in FIG. 1 can relatively easily detect a driving motorized vehicle by applying a relatively low threshold in the frequency range comprised between 500 Hz and 2 kHz. Radar unit RU1 can be relatively insensitive to pedestrians and non-motorized vehicles by applying a relatively high threshold in the frequency range comprised between 20 Hz and 100 Hz. Conversely, radar unit RU3 can relatively easily detect normally walking pedestrians by applying a relatively low threshold in the frequency range comprised between 20 Hz and 100 Hz. Radar unit RU3 can be relatively insensitive to driving motorized vehicles by applying a relatively high threshold in the frequency range comprised between 500 Hz and 2 kHz.

Let it now be assumed that the carrier signal CW is frequency modulated. In that case, the intermediate frequency spectrum representation IFS1 and the additional intermediate frequency spectrum representation IFS2 provide distance information as explained hereinbefore. A spectral component of relatively large magnitude, which has a given frequency, indicates the presence of an object. The frequency indicates the distance of the object which respect to the radar unit RU. The higher the frequency is, the greater the distance of the object. The additional detection module DET2 may carry out respective level detections in respective frequency ranges, which correspond to respective distance ranges. For example, referring to FIG. 4, a first level detector may carry out a level detection in a first distance range, which is relatively close to the radar unit RU. An N-th level detector may carry out a level detection in an N-th distance range, which is relatively distant from the radar unit RU.

In general, a spectral component that is caused by a reflection of an object, which is at a given distance, has a magnitude that decreases with the distance of the object to a power of four. As a result, the radar unit RU is potentially significantly more sensitive to objects that are relatively close to the radar unit RU than to objects that are relatively distant from the radar unit RU. This can result in an unsatisfactory detection characteristic: a significant object that is relatively distant from the radar unit RU may go undetected, whereas an insignificant object that is relatively close to the radar unit RU may unnecessarily be detected.

For example, let it be assumed a butterfly is relatively close to the radar unit RU, in the order of a few decimeters. The butterfly may produce a spectral component that has a relatively large magnitude, although the butterfly has a relatively small reflective surface, in the order of, for example, a few square centimeters. Let it now be assumed that a car is relatively distant from the radar unit RU, in the order of a few decameters. The car may produce a spectral component that has a magnitude that is comparable with that of the spectral component produced by the butterfly. This is despite the fact that the car has a significantly larger reflective surface, in the order of, for example, a few square meters. The magnitude of the spectral component produced by the car may even be lower than that produced by the butterfly.

In case the carrier signal CW is frequency modulated, the radar unit RU preferably applies an equalization to obtain a detection characteristic that accounts for the aforementioned decrease of magnitude with distance to the power of four. The equalization amplifies a spectral component that has a relatively high frequency, which is caused by a relatively distant object, with respect to a spectral component that has a relatively low frequency, which is caused by a relatively nearby object. The equalization may have a magnitude versus frequency response wherein magnitude increases with frequency to the power of four in a frequency interval of interest. This provides a full equalization in the frequency interval of interest. A partial equalization, which is achieved by a response wherein magnitude increases with frequency to a lesser degree, is also possible.

The equalization, either partial or full, may be achieved solely by means of the reception filter FIL. For example, the full equalization is achieved if the reception filter FIL exhibits the magnitude versus frequency response wherein the magnitude increases with the frequency to the power of four in the frequency interval of interest. However, this may have an adverse effect in terms of dynamic range. For example, a spectral component that has a relatively low frequency may effectively disappear below a noise level of the analog to digital converter ADC, or a spectral component that has a relatively high frequency may effectively overload the analog to digital converter ADC, or both.

The equalization may be achieved, at least partially, by means of the additional detection module DET2, assuming that this module is dedicated to providing distance information as mentioned hereinbefore. The equalization may be achieved by applying relatively high thresholds to level detections in relatively low frequency ranges, and by applying relatively low thresholds to level detections in relatively high frequency ranges. For example, let it be assumed that the additional detection module DET2 corresponds with the detection module DET1 illustrated in FIG. 1. In that case, the additional detection module DET2 may apply respective thresholds $TH_1, \ldots, TH_N$ in respective frequency ranges, whereby the thresholds increase as the respective frequency ranges are located higher in the additional intermediate frequency spectrum representation IFS2. In this respect, it should be recalled that the higher a frequency range is located in the intermediate frequency spectrum, the greater the frequency differences between the carrier signal CW, which is transmitted, and the reception signal RF.

It can be advantageous to achieve the equalization partially by means of the reception filter FIL and partially by means of the additional detection module DET2. Such a partitioning of the equalization may allow a higher dynamic range than concentrating, as it were, the equalization in a single entity. For example, let it be assumed that the full equalization should be achieved. In that case, it is possible to arrange the reception filter FIL so that, in the magnitude versus frequency response of this filter, the magnitude increases with the frequency to the power of two in the frequency interval of interest. The respective thresholds $TH_1, \ldots, TH_N$ that the additional detection module DET2 applies may be such that these decrease with frequency to the power of two. In such an implementation, the reception filter FIL accounts for half the full equalization, and the additional detection module DET2 accounts for the other half.

A method of defining thresholds for the additional detection module DET2 may be as follows. In a first step, a set of basic thresholds are determined that provide an appropriate equalization, at least partially. Each frequency range will have a basic threshold that is lower than those of lower frequency ranges, if any, and that is higher than those of higher frequency ranges, if any. That is, starting from the lowest frequency range, the basic thresholds monotonously increase according to a particular equalization curve. In the second step, the basic thresholds, which provide the appropriate equalization, may be adjusted so as to put higher or lower emphasis on respective distance ranges, which correspond with respective frequency ranges. That is, the radar unit RU can be made more sensitive, or less sensitive, to detecting an object of a given size depending on the distance of the object with respect to the radar unit RU. This can be regarded as superposing a detection curve on the equalization curve.

The control module CTM defines at least one lighting control action on the basis of the set of detection results DR1, which the detection module DET1 provides, and the additional set of detection results DR2, which the additional detection module DET2 provides, if present. In what follows, it is assumed that the set of detection results DR1 provides speed information and that the additional set of detection results DR2 provides distance information as described hereinbefore. Various examples of lighting control actions will be described hereinafter with reference to FIGS. 1 and 2.

For example, let it be assumed that, in radar unit RU1, the set of detection results DR1 indicates that the intermediate frequency spectrum representation IFS1 exceeds a threshold in a frequency range that corresponds with a speed range that is typical for relatively slowly driving motorized vehicles. In that case, the control module CTM may switch on lamppost LP1, which is associated with radar unit RU1 and disposed for illuminating the fast traffic lane FTL. To that end, the control module CTM may provide a control signal CS that causes switching on lamps within lamppost LP1.

Let it now be assumed that, in radar unit RU1, the set of detection results DR1 indicates that the intermediate frequency spectrum representation IFS1 exceeds a threshold in a frequency range that corresponds with a speed range that is typical for relatively fast driving motorized vehicles. In that case, the control module CTM may switch on lamppost LP1 and may additionally issue a message MS indicating that lamppost LP2 should be switched on. Radar unit RU1 may transmit this message MS to the system controller SCT via the communication interface CIF. Alternatively, radar unit RU1 may directly transmit this message MS to lamppost LP2. In any case, lamppost is switched LP2 on, in addition to lamppost LP1. This allows a relatively fast driving vehicle to look further ahead than a relatively slowly driving vehicle.

The control module CTM of a radar unit RU may thus implement a control strategy whereby a number of consecutive lampposts are switched on, including the lamppost with which the radar unit RU is associated. The control strategy may provide that the higher a frequency range is for which the detection module DET1 provides a positive detection result, the larger the number of consecutive lampposts that are activated. In that case, the faster a vehicle moves, the further the vehicle can look ahead thanks to the larger number of consecutive lampposts that are switched on.

Let it now be assumed that, in radar unit RU1, the set of detection results DR1 indicates that the intermediate frequency spectrum representation IFS1 exceeds a threshold only in a frequency range that corresponds with a speed range that is typical for normally cycling cyclists. In that case, the control module CTM may refrain from switching on lamppost LP1 which is associated with radar unit RU1 and disposed for illuminating the fast traffic lane FTL. Instead, the control module CTM may issue a message MS indicating that lamppost LP3 should be switched on. Radar unit RU1 may transmit this message MS to the system controller SCT via the communication interface CIF. Alternatively, radar unit RU1 may directly transmit this message MS to lamppost LP3. In any case, lamppost LP3 is switched on, while lamppost LP1 remains inactive. This will incite a cyclist to take the slow traffic lane STL instead of the fast traffic lane FTL. The control module CTM may apply a similar control strategy in case the intermediate frequency spectrum representation IFS1 exceeds a threshold only in a frequency range that corresponds with a speed range that is typical for normally walking pedestrians. This will equally incite a pedestrian to take the slow traffic lane STL.

The control module CTM of a radar unit RU that is associated with a lamppost disposed for illuminating a fast traffic lane may thus implement the following control strategy. In case the intermediate frequency spectrum representation IFS1 exceeds a threshold in a frequency range that corresponds with a speed range that is typical for vehicles that are supposed to take the fast traffic lane, the control module CTM switches on the lamppost. In case the intermediate frequency spectrum representation IFS1 does not exceed a threshold in any such frequency range, the lamppost remains inactive. However, the control module CTM may issue a message MS for switching on a relatively nearby lamppost that is disposed for illuminating a slow traffic lane STL, if a threshold is exceeded in any frequency range other than a frequency range that is typical for vehicles that are supposed to take the fast traffic lane FTL.

Conversely, the control module CTM of a radar unit RU that is associated with a lamppost disposed for illuminating a slow traffic lane may implement the following control strategy. In case the intermediate frequency spectrum representation IFS1 exceeds a threshold in a frequency range that corresponds with a speed range that is typical for pedestrians and vehicles that are supposed to take the slow traffic lane, the control module CTM switches on the lamppost. In case the intermediate frequency spectrum representation IFS1 does not exceed a threshold in any such frequency range, the lamppost remains inactive. However, the control module CTM may issue a message MS for switching on a relatively nearby lamppost that is disposed for illuminating a fast traffic lane, if a threshold is exceeded in any frequency range other than a frequency range that is typical for pedestrians and vehicles that are supposed to take the slow traffic lane.

The control module CTM may define a lighting control action other than merely switching on or off a lamppost. For example, the control module CTM may control a temporal variation of lighting depending on the set of detection results DR1 that the detection module DET1 provides. Let it be assumed that, in radar unit RU1, the set of detection results DR1 indicates that the intermediate frequency spectrum representation IFS1 exceeds a threshold in a frequency range that corresponds with a speed range that is typical for relatively slow driving motorized vehicles. In that case, the control module CTM may control lamppost LP1 so that there is a relatively slow increase of intensity of lighting provided by this lamppost. Conversely, in case a threshold is exceeded in a frequency range that corresponds with a speed that is typical for fast driving motorized vehicles, the control module CTM may cause a relatively fast increase of intensity of lighting.

The control module CTM of a radar unit RU, which is associated with a lamppost, may thus implement the following control strategy. The higher a frequency range is for which the detection module DET1 provides a positive detection results, the faster the lamppost is switched on in terms of a period of time that is covered to reach a given intensity of lighting starting from an absence of lighting. Simply stated, the faster an object moves, the faster the lamppost is switched on.

The control module CTM may define a lighting control action on the basis of the additional set of detection results DR2, which provides distance information. For example, let it be assumed that, in a lamppost, a additional set of detection results DR2 indicates that the additional intermediate frequency spectrum representation IFS2 only exceeds a threshold in a relatively high frequency range. This indicates the presence of an object that is relatively distant from the lamppost, whereas there are no significant objects that are relatively close to the lamppost. In that case, the control module CTM may control the lamppost so that intensity of lighting is relatively low Let it now be assumed that the additional set of detection results DR2 indicates that the additional intermediate frequency spectrum representation IFS2 exceeds a threshold in a relatively low frequency range. This indicates the presence of an object that is relatively close to the lamppost. In that case, the control module CTM may control the lamppost so that the intensity of lighting is relatively high.

The control module CTM may thus implement the following control strategy. The lower a frequency range is for which the additional detection module DET2 provides a positive detection results, the stronger the intensity of lighting. Accordingly, the closer an object is, the stronger the intensity of lighting. In case the object is within a given proximity zone, the intensity of lighting may remain constant at a relatively high level.

The control module CTM of a radar unit RU may further define lighting control actions and strategies based on evolutions of the set of detection results DR1 and the additional set of detection results DR2 over time. Such evolutions over time provide information on, for example, traffic density, as well as type of traffic. For example, the control module CTM may determine that, in a recent time interval, the set of detection results DR1 has relatively frequently comprised positive detection results for relatively high frequency ranges. This indicates a relatively high density of motorized vehicles. In that case, the control module CTM may control the lamppost so that the lamppost stays on for a relatively long period of time after having been switched on. The control module CTM anticipates, as it were, detection of a subsequent motorized vehicle shortly following a most recently detected the motorized vehicle. This prevents the lamppost from being frequently switched on and off when traffic density is relatively high, which would be inefficient, and which may even be considered as annoying by road users.

Let it now be assumed that, in a recent time interval, the set of detection results DR1 as a relatively rarely comprised any positive detection results. This indicates a relatively low traffic density. In that case, the control module CTM may control the lamppost so that the lamppost only stays on for a relatively short period of time after having been switched on. The control module CTM anticipates, as it were, that no vehicle will follow shortly after a vehicle that has currently been detected.

The control module CTM may further apply a statistical analysis to the set of detection results DR1, as well as to the additional set of detection results DR2. The control module CTM may thus identify, for example, time frames in which traffic density is typically relatively high and time frames in which traffic density is typically relatively low. The control module CTM may apply a statistic analysis to determine a lighting control strategy that is power efficient. The control module CTM may also apply a statistic analysis for determining whether the lamppost of the radar unit RU of which it forms part, is disposed for illuminating a slow traffic lane or disposed for illuminating a fast traffic lane, or disposed otherwise. Accordingly, the control module CTM can make the radar unit RU self learning, as well as the lamppost with which the radar unit RU is associated.

For example, let it be assumed that, over a time interval of observation, the detection module DET1 provides significantly more positive detection results for relatively high frequency ranges than for relatively low frequency ranges. In that case, the control module CTM can conclude, as it were, that the lamppost is disposed for illuminating a fast traffic lane. Conversely, in case the detection module DET1 provides significantly more positive detection results for relatively low frequency ranges than for relatively high frequency ranges, the control module CTM can conclude that the lamppost is disposed for illuminating a slow traffic lane. This is an example of the radar unit RU being self-learning by applying a statistical analysis to the set of detection results DR1.

The control module CTM preferably comprises a control override submodule through which a user can control lighting independent of the detection results and the additional detection results, if present. For example, a command from the system controller SCT illustrated in FIG. 1 may activate the control override submodule. The command may be general in the sense that a control override occurs in all radar units that depend on the system controller SCT, so that all lampposts can be controlled manually. The command may also be selective in the sense that the control override occurs in all radar units in a particular zone. This allows, for example, a police or an emergency service to switch on all lampposts with maximum power in a particular zone where an emergency has occurred.

Final Remarks

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods involving lighting based on radar detection. Street lighting is merely an example. As another example, the invention may be applied to advantage in an interior lighting system. Furthermore, it should be noted that the invention may be applied to advantage for various types of radar detection. Radar detection based on transmission of electromagnetic waves is merely an example. As another example, radar detection may be based on transmission of ultrasound waves.

Furthermore, it should be noted that principles of radar detection other than Doppler radar and FMCW can be used (FMCW is an acronym for frequency modulation continuous wave). For example, distance can be measured using a pulse radar principle rather than an FMCW principle. The pulse radar principle is based on detecting a delay between transmission of a pulse and reception of the pulse. A distance can be calculated on the basis of this delay. The pulse that is received can be subject to detection of spectral power distribution in a fashion similar to that described hereinbefore with reference to FIGS. 2-5. That is, speed information, as well as distance information, can be extracted from the pulse that is received.

A system need not necessarily comprise an electrical power source and a power distribution cable in order to implement the invention. For example, each radar unit may be powered individually by means of, for example, a solar panel, which may be complemented with a battery. In such an implementation, the radar units may communicate with each other in a wireless fashion.

There are numerous ways in which a radar unit can detect a spectral power distribution. For example, referring to FIG. 2, the Fourier transform module FFT1 may be replaced by a bank of filters that have respective pass bands. Each filter passes a particular spectral portion of the filtered intermediate frequency signal IFF. Respective spectral portions may then be applied to a bank of level detectors, similar to the detection module DET1 illustrated in FIG. 4, whereby each level detector receives a particular spectral portion. The spectral power distribution may also be detected by means of analog circuits, in which case an analog to digital converter is not necessary. Such an analog implementation may comprise a bank of analog filters followed by a bank of analog level detectors.

It should further be noted that spectral power distribution detection may comprise level detections with respect to multiple thresholds in a frequency range. That is, spectral power distribution detection need not necessarily be binary as illustrated in FIG. 5. For example, a level detector of the detection module DET1 illustrated in FIG. 4 may carry out a level detection with respect to two thresholds: a lower threshold and an upper threshold. In that case, the level detector may provide a detection result that can have three values: a first value if there are no components in the frequency range concerned that exceed the lower threshold, a second value if there is a strongest component comprised between the lower threshold and the upper threshold, and a third value if there is a component that exceeds the upper threshold. The control module CTM may then apply a different lighting control action for each of these three detection result values.

There are numerous ways in which a radar unit can be implemented. For example, referring to FIG. 2, the additional Fourier transform module FFT2 and the additional detection module DET2 may be dispensed with. In that case, the detection module DET1 may have two modes of operation: one mode adapted to provide speed information when the carrier signal CW has a stationary frequency, the other mode being adapted to provide distance information when the carrier signal CW is frequency modulated. The Fourier transform module FFT1 may also have two such modes of operation. The Fourier transform module FFT1 and the detection module DET1 may then alternately operate in the one or the other mode depending on whether the carrier signal CW is stationary in frequency or frequency modulated, respectively.

A radar unit may advantageously comprise an intermediate frequency signal processing path that has a quadrature structure, with an in phase branch and a quadrature branch. In that case, the radar unit can make a distinction between positive and negative frequencies differences between the carrier signal that is transmitted and a reflection thereof that is received. An intermediate frequency representation may then comprise a negative frequency half portion and a positive frequency half portion. A detection module may be adapted to carry out a level detection in a frequency range in the negative half frequency portion, and a further, separate level detection in a corresponding frequency range in the positive half portion. Different thresholds may then apply in these frequency ranges. Accordingly, the radar unit can then be more sensitive to an object that is moving towards the radar unit with a given speed, than an object that is moving away from the radar unit with the same speed, or vice versa. Moreover, the control module may be adapted to apply different lighting control actions depending on whether the object moves towards the radar unit, or moves away from the radar unit. It should further be noted that a radar unit need not necessarily have an intermediate frequency that is "zero" as in the radar unit described with reference to FIG. 2. In principle, the radar unit may have any intermediate frequency, or even no intermediate frequency at all, which implies a form of direct detection.

The term "radar unit" should be understood in a broad sense. The term embraces any entity capable of transmitting a signal and receiving and processing a reflection of the signal that is transmitted.

In general, there are numerous different ways of implementing the invention, whereby different implementations may have different topologies. In any given topology, a single module may carry out several functions, or several modules may jointly carry out a single function. In this respect, the drawings are very diagrammatic. For example, referring to FIG. 2, the analog to digital converter ADC and the programmable processor PPR may form part of a single integrated circuit module.

There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. A lighting system comprising:
    a radar arrangement arranged to transmit a signal and to detect a spectral power distribution of a received signal susceptible of comprising a reflection of the signal that has been transmitted, wherein the radar arrangement is arranged to carry out respective level detectors in respective frequency ranges that correspond with respective frequency differences between the signal that is transmitted and the received signal, and whereby the radar arrangement is arranged to apply a spectral emphasis/de-emphasis in detecting the spectral power distribution by applying respective thresholds to respective level detections; and
    a control arrangement arranged to control lighting depending on the respective level detectors in the respective frequency ranges.

2. A lighting system according to claim 1, wherein the control arrangement is arranged to control at least one of the following properties of the lighting as a function of the spectral power distribution that has been detected: an area that the lighting covers, an intensity of the lighting, and a temporal variation of the lighting.

3. A lighting system according to claim 1, comprising:
    at least one lamp disposed for illuminating a slow traffic lane, and a least one lamp disposed for illuminating a fast traffic lane; and wherein
    the control arrangement is arranged to activate at least one lamp disposed for illuminating the slow traffic lane if a level detection in a frequency range that corresponds with a low frequency difference indicates that the spectral power distribution exceeds a threshold in that frequency range, and to activate at least one lamp disposed for illuminating the fast traffic lane in case a level detection in a frequency range that corresponds with a high frequency difference indicates that the spectral power distribution exceeds a threshold in that frequency range.

4. A lighting system according to claim 1, comprising:
    respective lamps disposed for illuminating respective portions of a lane; and wherein
    the control arrangement is arranged to activate a number of consecutive lamps, whereby the higher a frequency range is in which a level detection indicates that the spectral power distribution exceeds a threshold in this frequency range, the larger the number of consecutive lamps that are activated.

5. A lighting system according to claim 1, wherein:
    the control arrangement is arranged to control a temporal variation of the lighting depending on the respective level detections in the respective frequency ranges.

6. A lighting system according to claim 1, wherein the radar arrangement comprises a beam forming arrangement so as to concentrate power of the signal in a particular direction, the radar arrangement being arranged to adjust the respective thresholds in dependence on the particular direction in which the power of the signal is concentrated.

7. A lighting system according to claim 1, wherein the radar arrangement comprises a Fourier transform module arranged to provide a frequency domain representation of the received signal, and a detection module arranged to detect the spectral power distribution of the received signal from the frequency domain representation.

8. A lighting system according to claim 1, comprising:
    a set of lighting modules; and wherein
    the radar arrangement comprises respective radar modules associated with respective lighting modules, a radar module being arranged to individually transmit a signal and to individually detect a spectral power distribution of a received signal susceptible of comprising a reflection of the signal that has been transmitted; and
    the control arrangement comprises respective control modules associated with respective lighting modules, a control module being arranged to control the lighting module with which the control module is associated and at least one other lightening module.

9. A lighting system according to claim 1, wherein the radar arrangement is arranged so that the signal, which is transmitted, is at least temporarily a frequency-modulated carrier.

10. A lighting system according to claim 9, wherein the respective thresholds decrease as the respective frequency ranges correspond with greater frequency differences between the signal that is transmitted and the received signal.

11. A lighting system according to claim 1, wherein the control arrangement comprises a control override module through which a user can control the lighting independent of the spectral power distribution of the received signal that has been detected.

12. A method of controlling a lighting system that comprises:
    a radar arrangement arranged to transmit a signal and to detect a spectral power distribution of a received signal susceptible of comprising a reflection of the signal that has been transmitted, whereby the radar arrangement is arranged to carry out respective level detections in respective frequency ranges that corresponds with respective frequency differences between the signal that is transmitted and the received signal, the method comprising:
    a detection control step in which a spectral emphasis/de-emphasis is applied in detecting the spectral power distribution by applying respective thresholds to respective level detections; and
    a lighting control step in which lightening is controlled depending on the respective level detections in the respective frequency ranges.

* * * * *